UNITED STATES PATENT OFFICE

2,034,522

FIREPROOF BUILDING MATERIAL

Emil C. Loetscher, Dubuque, Iowa

No Drawing. Application February 19, 1934,
Serial No. 711,996

8 Claims. (Cl. 154—45.9)

This invention relates to improvements in fireproof building material, and more particularly to a composite material of exceptionally high fire-resisting properties and adapted to be produced commercially in the form of sheets, boards or panels for use as a general fireproof structural material, or in the form of fabricated units or special shapes such as doors, door panels, interior trim, and such articles as make up the ordinary run of mill-work products.

Briefly, the material herein contemplated is a composition of which the basic ingredient is asbestos in which are incorporated certain binders of a resinous and inorganic character so compounded and treated as to produce the essential objects of the invention, namely, the production of a hard dense building material which can be worked with the same degree of ease as natural wood lumber and yet possessing the valuable property of withstanding high temperatures without appreciable deterioration.

It may be observed at the outset that composite fireproof materials utilizing asbestos as the base, are known in the art. For example, compositions of asbestos and a phenol condensation product have been used for moulding articles of intricate shape and design, and as such contain a high percentage of the synthetic resin, that is, fifty per cent (50%) or more. But such compounds contain such a high percentage of resin (up to 50%) in order to obtain the required moulding plasticity, that they are too costly for use as a building material. Moreover, such compounds are not entirely fire-resistant, particularly at high temperatures of, say 2000° F. at which the resin becomes carbonized and loses its strength as a binder.

Another known type of composite fireproof building material is one composed of asbestos and Portland cement, a cementitious product requiring a long period of seasoning before it is usable, and then it becomes so hard as to be unworkable with ordinary tools. Its usefulness is, therefore, limited to standard shapes and sizes such as blocks, tile, etc., and has all the characteristics of artificial stone or ceramic material rather than lumber.

On the other hand, the material herein to be disclosed has neither the prohibitive cost or limited fireproof qualities of the so-called moulding mixtures nor the unworkability and aging drawback of the cementitious product. It is ready for use immediately upon leaving the press, and does not alter its nature or characteristics thereafter. Moreover, it can be readily fabricated by planing, sawing or cutting with ordinary wood-working tools without undue dulling of cutting edges, and presents smooth polished surfaces permitting one or both sides to be exposed and giving a finished appearance without additional labor, unless perchance an unusually fine surface finish is desired. Again, it may be made commercially in a large variety of sizes and thicknesses to meet the requirements of different classes of work, being only limited in those respects to the capacity and size of press available. And finally, the material may be made in different grades, that is to say, it may be of a uniform character or texture throughout its thickness or it may consist of a core covered on one or both sides with a thin layer of a slightly finer texture and presenting a somewhat more finished surface, although essentially the material is of the same composition throughout.

Inasmuch as the novel features of the invention are embodied in the composition, physical characteristics and method of producing the material, it is not believed that a drawing is necessary to a clear understanding of the disclosure.

In its essential form the material may be visualized as a hard compact mass of a fine homogeneous texture and uniform color throughout, with the absence of grain or the fibrous structure that characterizes natural wood or the so-called compressed wood substitutes therefor. As already pointed out, the basic ingredient of the material is asbestos in its fibrous or loose state. Two grades of asbestos are used, viz: the short and long fiber asbestos, the former also including the ground forms. The short fiber and ground forms of asbestos are more plentiful and, therefore, cheaper, although they naturally do not have quite the cohesive properties of the long fiber varieties. Hence it is preferred to mix the two in the proportion of, say, two (2) parts of the short to one (1) part of the long fiber asbestos.

Incorporated in this mixture of asbestos is 15% by weight of a synthetic resin, generally of the phenol-formaldehyde group, but particularly a relatively inexpensive type of resin of which its phenol source is creosol, and having other advantages such as water solubility to make it particularly suitable for this purpose. Incidentally this resin is the subject matter of U. S. Letters Patent No. 1,959,433 dated May 22, 1934. In addition to the resin, the composition contains five per cent (5%) of sodium silicate and five per cent (5%) of ammonium sulphate, sodium sulphate, ammonium phosphate, zinc chloride or other chemically equivalent salt. Or to state the proportions of the several ingredients of the composition as a formula, it contains by weight the following:

| | Per cent |
|---|---|
| Short fiber asbestos | 50 |
| Long fiber asbestos | 25 |
| Synthetic resin | 15 |
| Sodium silicate | 5 |
| Ammonium sulphate or like salt | 5 |

The proportions stated, however, may be varied somewhat from those given without materially altering the character of the product.

In the manufacture of the product, those ingredients are thoroughy and intimately mixed in accordance with the process hereinafter to be set forth, and then compressed to a dense mass having in addition to the fire-resisting properties an exceedingly low water and moisture absorption estimated by test not to exceed 1% after 70 to 80 hours of immersion in water.

In designating a material merely as fireproof is obviously not altogether definite, inasmuch as it is a relative term. Thus a material may not be combustible when exposed to moderate temperatures, and yet be consumed in the presence of the intense heat such as is created during a destructive conflagration. For example, a material composed of asbestos and a high percentage of synthetic resin as the binder, is generally regarded as fire-resisting, but this only holds true in a degree, inasmuch as the resin carbonizes at extreme temperatures, whereupon its binding property fails and the material will disintegrate. Moreover, in the process of carbonization, the resin evolves a combustible gas which burns, so that it is not non-combustible in the true sense of the word.

The material of this disclosure is, on the contrary, a perfect non-combustible for the following reasons: In the first place, the quantity of synthetic resin is relatively small (not over 15%) just enough to give the material its permanent set and hardness during the pressing operation. Secondly, the sodium silicate while serving as a mechanical binder at normal temperatures, becomes even more active as a bonding agent at extremely high temperatures, so that the material is held together and resists disintegration even after the synthetic resin has been burned out. And finally, the ammonium sulphate acts as a fireproofing agent in the sense that it reacts in the presence of heat to give off a non-combustible gas or vapor acting to neutralize whatever combustible gas is evolved from the resin, to the end that even with the reduced amount of resin present, there will be no element present which will burn in the presence of an intense flame, or support combustion after the flame has been removed.

Thus it will be seen that any material, in order to be dependable for use in fireproof construction, must not only be non-combustible, i. e., not support combustion, but equally important, will not disintegrate or warp out of shape by reason of the failure or burning out of the bonding agent. It is for this reason that the proportion of synthetic resin used is just enough to give the material its high water-resisting property in addition to its inherent capacity as a bonding agent after it has been reacted in the presence of heat in the pressing operation. But the important fact is that the resin is not relied on solely as the bonding agent, but is amplified by the sodium silicate with its capacity to react with increased bonding effect at temperatures which would destroy the adhesive properties of any resinous substance. As a consequence, a door for example, made of this material will not support combustion, nor will it disintegrate or warp when subjected to intense heat, as would be the case if it were made of a composition of only asbestos and a high percentage of resin. Then too, being a material of high heat insulating properties, a door or walls constructed thereof would prevent the spreading of fire therebeyond, since heat would not be conducted through such barriers, and in the case of a door, around the edges thereof, a feature notably lacking even in the so-called fireproof metal doors, which naturally become red-hot and not only tend to warp but actually transmit the heat from one side to the other.

So much for the essential characteristics of the material as a fire-resisting substitute for other known building materials of reputed fireproofing properties.

As already mentioned, the material in its commercial forms may be made of the same composition throughout, or stratified as a thick core with thin outer layers or surface coatings of a somewhat finer texture, the only difference being in the make-up of the mixture for the outer layers.

For the outer surface layer mixture prepared independently of the core mixture, the ground or short fiber asbestos is used largely, if not entirely, and being of a finer texture, does not give the mottled or spotty surface finish that would attend the use of the long fiber asbestos. Thus the basis of the mixture would be eighty per cent (80%) of the ground or short fiber asbestos in which is incorporated fifteen per cent (15%) of the same synthetic resin as used in the core mixture, or if preferred, a more expensive phenol condensation product may be substituted, and five per cent (5%) of sodium silicate as before.

It will be observed that the proportions of the ingredients are not materially altered, although the amount of the asbestos has been increased slightly and the ammonium sulphate or like salt omitted entirely, the net result being a slight increase in both asbestos and resin, with the sodium silicate remaining the same in its proportion to the entire mass.

The slight variation in the proportions of the ingredients of the outer layer mixture as well as the omitting of the resin fireproofing agent may be put upon the following grounds: In the first place, the outer layers are comparatively thin, and with the slight excess of resin a somewhat harder surface film is produced and one that will offer a smoother and more lustrous surface finish. And secondly, the amount of resin in the outer layers is almost negligible, as compared with that in the total mass of the material, and hence whatever combustion that might occur from the gases evolved from this amount of resin would be dissipated almost immediately, and hence no particular need for providing against it. In short, an increased resin content in the surface layers is more advantageous than the decreased combustibility, although manifestly ammonium sulphate can be included in the outer layer mixture if desired.

Now to prepare the core mixture, a quantity of asbestos in its loose flaky state and in the given proportion of short and long fiber grades are placed in a suitable agitator such as a revolving tumbling mill, preferably heated as by a steam jacket in order to raise the temperature to 150° or 180° F. The synthetic resin in the form of a dilute solution containing the requisite 15% of the resinous substance in its dry state, is next sprayed into contact with the agitated fiber as a fine mist, this process being continued until each fiber is coated with resin and the entire mass reduced to a dry state by the heat supplied to the mill, the temperature being purposely maintained within the range stated in order that the resin will not react prematurely. Next, the sodium silicate in its proper proportion is sprayed into the mass in the form of a dilute solution, and by the same process of agitation and drying, is thoroughly distributed throughout the resin-coated particles. And finally, in the same manner the ammonium sulphate or like salts is incorporated in the mixture, that is, by spraying a solution into the agitated mass. In each case, therefore, the several ingredients are successively sprayed into the mass of asbestos, the resulting mixture in each case being thoroughly dried before the next is added, thereby obtaining an even and uniform distribution throughout the entire mass. It is not essential, however, that the ingredients be added to the asbestos in the order indicated, except perhaps that it would be natural to incorporate the resin first, inasmuch as its quantity is greater than the other ingredients, and hence a better opportunity to be absorbed by the asbestos.

The mixture for the outer layers is prepared in the same manner as the core mixture, the only difference being the grade of asbestos used and the omission of the ammonium sulphate or equivalent.

The process preferably to be adopted in the manufacture of the product from the mixtures thus prepared is as follows: A metal plate having a smooth, highly polished surface, is placed on a table and a removable form with upstanding rails is clamped around the edges, thus providing a form of the dimensions of the finished product, as for instance, 12 feet by 4 feet. Into this form is sifted a thin layer of the dry outer surface mixture, then a much thicker layer of the core mixture and finally another thin layer of the surface material. For a product of ⅛ inch in thickness, the loose material would be built up to a thickness of, say, 2 inches, three-quarters of which would be core and one-quarter surface material divided equally between the top and bottom layers, these latter being reduced to thicknesses of approximately 1/64 inch in the finished product. For boards or panels of increased thickness, the initial thickness of the core material would be increased proportionately, although ordinarily the thickness of the outer surface layers would remain the same.

The stratified material as deposited upon the plate is in a more or less unstable, flaky condition, and therefore it is preferred to subject it to a preliminary pressing operation by transferring the form to a press and sufficient pressure exerted on the material to compress it into a relatively stable mat having a thickness of, say, ½ inch. In this condition, the enclosing frame can be removed, and the plate with the partially compressed material is transferred to another press for the final operation of reducing it to its finished state.

Preparatory to the final press operation another polished plate is placed face down upon the mat and the complete assembly introduced between the platens of the press, these platens being hollow and equipped with connections so that live steam can be circulated through them for heating and water for cooling. The mat is compressed between the heated platens at a pressure of from 1000 to 2000 pounds per square inch for a period of from five to seven minutes or more, depending on the thickness of the product being made. A very satisfactory product will be produced at the lower pressure stated, with a slight increase in strength and density as the higher pressure is approached, although pressures above 2000 pounds have not been found to be either necessary or advantageous.

During this combined heating and pressure treatment, the temperature of the platens is brought up to about 280° F., a point at which the synthetic resin reacts, becoming hard and infusible. After the heat has been continued for the required period of time, the platens may be cooled down sufficiently to allow the finished material to be handled, this being done by circulating water through the platens in place of the steam. However, the product need not be restored to room temperature before removal from the press, in fact, the less amount of cooling, the more efficient the press operation, since less time is required for reheating the platens for the next cycle.

The product on leaving the press is in its finished state, requiring no further seasoning or treatment to render it suitable for immediate use. Its surface or surfaces can, however, be treated to improve its appearance and finish, or for instance, by applying a coating of paper, cloth or thin wood veneer impregnated with a synthetic resin varnish, or merely a coating of the varnish.

The same process is followed for making the product of a uniform texture throughout, the only departure being the use of the core mixture for the entire thickness of the initially formed mat, and except for a slightly inferior surface finish, it has all of the physical characteristics and structural advantages of the stratified product.

For certain special uses, the product may be made by incorporating from 25% to 30% of finely divided woody particles of highly resinous or pitchy nature, with the asbestos fiber, together with a small amount (from ½ of 1% to 5%) of a resin hardening agent such as hydrated lime, zinc oxide or the like, to react with the natural resins in the resinous wood particles and render the same stable in the presence of the heat to which the material is subjected during the final press operation. Such a material would combine the features of hardness and high water-resisting properties of that disclosed in my application, Serial No. 692,811, filed October 9, 1933, (in which woody particles are used entirely for the base), with the high degree of fireproofness attributable to the asbestos and other ingredients combined therewith. Moreover, such a material would have exceedingly high dielectric properties and therefore especially suited for electric insulation purposes.

It is, therefore, important to observe that the composition of the material can be varied to meet the requirements of the particular use to which it is to be put. For example, there are uses which may require a greater plasticity in the initial mix so that it can be pressed into special shapes other than flat boards, and where waterproofness, mechanical strength and a hard surface finish are more essential than fireproofness, due to the absence of fire hazard. Under these conditions, the proportion of the synthetic resin can be increased with or without decreasing the proportion of sodium silicate, inasmuch as it is the amount of the thermo-setting resin present that determines its hardness and density and gives it the non-moisture absorbing property so desirable in a building material. On the other hand, it has been pointed out that as the proportion of synthetic resin is increased, the ability of the material to withstand intense heat is reduced somewhat on account of the carbonization and consequent loss of bonding strength in the resin under extreme fire conditions. This does not mean that the material loses any of its fire-resisting properties when subjected to ordinary temperatures, but rather that when maximum resistance against destruction from fire is the chief consideration, then some of its other properties may be sacrificed in a degree by maintaining the resin content at a minimum, and depending on the sodium silicate as the bonding agent due to its capacity to fuse at the temperature above which the resin would be destroyed.

Having, therefore, set forth the merits of the product embodying the invention and the process of manufacturing the same,

I claim:

1. A hard pressed fire-resisting building material consisting of a core composed of a mixture of long and short fiber asbestos impregnated with substantially fifteen per cent (15%) of a synthetic resin, five per cent (5%) of sodium silicate, and five per cent (5%) of ammonium sulphate, and thin outer coatings of substantially the same mixture but containing slightly greater proportions of the short fiber asbestos and synthetic resin.

2. A hard pressed fire-resisting building material consisting of a mass of asbestos fiber impregnated with substantially fifteen per cent (15%) of a synthetic resin and five per cent (5%) of sodium silicate, the bulk of the material forming a core characterized by the presence of a relatively large proportion of long fiber asbestos and the addition of a relatively small proportion of ammonium sulphate, said core having thin outer layers of substantially the same ingredients but characterized by a substantial increase in the proportion of short and ground asbestos fiber present and the absence of ammonium sulphate.

3. A composite fireproof building material composed of a mixture of asbestos fiber, sufficient of a resinous substance to combine with the asbestos fiber to form a hard, dense mass, and a quantity of a silicate adapted to become active at temperatures destructive to the resin as the binder for the material.

4. A composite fireproof building material composed of a mixture of asbestos fiber, a synthetic resin combined with the fiber to form a hard, dense mass, and a relatively small proportion by weight of sodium silicate adapted to become active at temperatures above that destructive to said synthetic resin to function as a binder for the material.

5. A hard pressed fireproof building material consisting of asbestos fiber having incorporated therewith substantially fifteen per cent (15%) by weight of a synthetic resin, and substantially five per cent (5%) each by weight of an alkali-metal silicate and ammonium sulphate, said silicate and sulphate being active at destructive temperatures to preserve the fireproofing property of the material in the manner described.

6. A hard pressed fireproof building material consisting of a mixture composed of substantially seventy-five per cent (75%) of asbestos fiber, fifteen per cent (15%) of synthetic resin, and five per cent (5%) each of sodium silicate and a sulphate.

7. A hard pressed fireproof building material consisting of a mixture of substantially seventy-five per cent (75%) by weight of asbestos fiber, fifteen per cent (15%) or less of a synthetic resin of the phenol formaldehyde group, substantially five per cent (5%) of sodium silicate, and sufficient of a predetermined chemical reagent to quench the combustible gases generated by the resin at extremely high temperatures.

8. A hard pressed fireproof building material consisting of a mixture of substantially seventy-five per cent (75%) of asbestos fiber in the proportion of one (1) part of the long fiber to two (2) parts of the short fiber asbestos, fifteen per cent (15%) of a synthetic resin of the phenol formaldehyde group, five per cent (5%) of sodium silicate, and substantially five per cent (5%) of ammonium sulphate.

EMIL C. LOETSCHER.